(12) United States Patent
Guo et al.

(10) Patent No.: US 9,871,466 B2
(45) Date of Patent: Jan. 16, 2018

(54) INVERTER SWITCHING FREQUENCY CONTROL METHOD AND APPARATUS

(71) Applicant: Huawei Technologies Co., Ltd., Shenzhen (CN)

(72) Inventors: Haibin Guo, Shanghai (CN); Kai Xin, Shanghai (CN); Li Lu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 169 days.

(21) Appl. No.: 14/747,744

(22) Filed: Jun. 23, 2015

(65) Prior Publication Data
US 2015/0381073 A1 Dec. 31, 2015

(30) Foreign Application Priority Data

Jun. 25, 2014 (CN) .......................... 2014 1 0293366

(51) Int. Cl.
*H02M 7/537* (2006.01)
*H02M 7/5387* (2007.01)
(Continued)

(52) U.S. Cl.
CPC ....... *H02M 7/537* (2013.01); *H02M 7/53871* (2013.01); *H02M 7/5395* (2013.01);
(Continued)

(58) Field of Classification Search
CPC .................. H02M 1/44; H02M 7/537; H02M 2001/0054; H02M 2001/0032; H02M 2001/0012
See application file for complete search history.

(56) References Cited

U.S. PATENT DOCUMENTS

| 9,083,230 B2 * | 7/2015 | Narimani ................ H02M 3/07 |
| 2002/0161490 A1 * | 10/2002 | Nagasu ................... B60L 15/38 |
| | | 701/19 |

(Continued)

FOREIGN PATENT DOCUMENTS

| CN | 201234237 Y | 5/2009 |
| CN | 101841256 A | 9/2010 |

(Continued)

OTHER PUBLICATIONS

Foreign Communication From a Counterpart Application, European Application No. 15173247.6, Extended European Search Report dated Mar. 22, 2016, 5 pages.

(Continued)

*Primary Examiner* — Yusef Ahmed
(74) *Attorney, Agent, or Firm* — Conley Rose, P.C.

(57) ABSTRACT

An inverter control method, apparatus, and system are provided. The method in the embodiments of the present invention includes obtaining power distribution line graph of an inverter switch according to an output power and an input voltage that are of an inverter; when an area to which the inverter belongs is a first area and the inverter switch works at a second frequency, switching the inverter switch to a first frequency; and when the area to which the inverter belongs is a second area and the inverter switch works at the first frequency, switching the inverter switch to the second frequency. In the embodiments of the present invention, whether a working frequency of an inverter switch needs to be changed is determined according to an output power and an input voltage, which improves control efficiency, thereby effectively improving conversion efficiency of an inverter.

14 Claims, 3 Drawing Sheets

(51) Int. Cl.
 H02M 7/5395 (2006.01)
 H02M 1/00 (2006.01)
(52) U.S. Cl.
 CPC ............... *H02M 2001/0032* (2013.01); *H02M 2001/0054* (2013.01); *Y02B 70/1491* (2013.01); *Y02B 70/16* (2013.01)

(56) References Cited

U.S. PATENT DOCUMENTS

| | | | | |
|---|---|---|---|---|
| 2007/0171679 A1* | 7/2007 | Nielsen | ............... | H02M 3/3376 363/16 |
| 2009/0091955 A1* | 4/2009 | Choi | ................. | H02M 3/33507 363/37 |
| 2009/0279336 A1* | 11/2009 | Erdman | ............ | H02M 7/53875 363/131 |
| 2009/0284265 A1* | 11/2009 | Ohta | .................... | H02H 1/0015 324/536 |
| 2010/0315849 A1* | 12/2010 | Ingemi | .................... | H02J 9/062 363/89 |
| 2011/0043160 A1 | 2/2011 | Serban | | |
| 2012/0113687 A1* | 5/2012 | Wildrick | ............. | H02M 3/3378 363/21.02 |
| 2013/0020976 A1* | 1/2013 | Jeon | ........................ | H02M 7/49 318/453 |
| 2013/0154395 A1* | 6/2013 | Chiang | ................. | H02M 7/493 307/151 |
| 2013/0229120 A1* | 9/2013 | Choutov | ............ | H05B 33/0815 315/186 |
| 2013/0249431 A1* | 9/2013 | Shteynberg | ............ | H05B 37/02 315/287 |
| 2013/0286704 A1* | 10/2013 | Liu | ........................ | H02M 1/12 363/132 |
| 2014/0036557 A1* | 2/2014 | Nondahl | ................. | H02M 1/12 363/71 |
| 2014/0268957 A1* | 9/2014 | Khajehoddin | ........ | H02J 3/1842 363/95 |
| 2015/0200607 A1* | 7/2015 | Fujii | ................. | H02M 7/53871 363/97 |
| 2015/0224845 A1* | 8/2015 | Anderson | ............ | B60G 17/019 701/37 |
| 2016/0094037 A1* | 3/2016 | Eren | ....................... | H02J 3/383 363/95 |
| 2016/0114688 A1* | 4/2016 | Koizumi | ................. | H02J 5/005 307/104 |
| 2016/0118897 A1* | 4/2016 | Soares | ............. | H02M 3/33507 363/21.12 |
| 2016/0181945 A1* | 6/2016 | Ding | ....................... | H02M 1/00 307/82 |
| 2016/0211765 A1* | 7/2016 | Han | ........................ | H02M 7/42 |
| 2016/0282398 A1* | 9/2016 | Zhu | ........................ | H02S 50/10 |
| 2016/0294189 A1* | 10/2016 | Uno | ........................ | G05F 1/67 |

FOREIGN PATENT DOCUMENTS

| | | |
|---|---|---|
| CN | 102299645 A | 12/2011 |
| CN | 102483636 A | 5/2012 |
| CN | 102751742 A | 10/2012 |
| CN | 102751744 A | 10/2012 |
| EP | 0029744 A | 11/1980 |
| JP | 0522864 A | 1/1993 |

OTHER PUBLICATIONS

Partial English Translation and Abstract of Chinese Patent Application No. CN102751742A, Oct. 10, 2015, 3 pages.
Foreign Communication From a Counterpart Application, PCT Application No. PCT/CN2014/095077, International Search Report dated Mar. 23, 2015, 8 pages.
Foreign Communication From a Counterpart Application, PCT Application No. PCT/CN2014/095077, Written Opinion dated Mar. 23, 2015, 3 pages.

* cited by examiner

INVERTER SWITCHING FREQUENCY CONTROL METHOD AND APPARATUS

CROSS-REFERENCE TO RELATED APPLICATION

This application claims priority to Chinese Patent Application No. 201410293366.2, filed on Jun. 25, 2014, which is hereby incorporated by reference in its entirety.

TECHNICAL FIELD

The present invention relates to the field of power generating system, and in particular, to an inverter control method, apparatus, and system.

BACKGROUND

A solar panel and an inverter are two important components in a grid-tied photovoltaic power generating system. The solar panel can convert optical energy of the sun into electrical energy and output a direct current, and the inverter converts the direct current, which is output by the solar panel, into an alternating current that can be input to a power grid for use. Because solar radiation density is low, conversion efficiency of a solar battery is extremely low (approximately 10%-20%). Therefore, to improve efficiency of a grid-tied photovoltaic power generating system, conversion efficiency of an inverter needs to be improved.

In the prior art, a method for dynamically adjusting a switching on/off frequency of a power switching transistor of an inverter according to output power of the inverter is provided. When the output power is relatively small, the switching on/off frequency of the power switching transistor is changed, so that loss of the power switching transistor can be reduced in a case when the output power of the inverter is relatively small. However, if the switching on/off frequency of the power switching transistor is adjusted only according to the output power of the inverter, a relatively large error is caused, and control efficiency is low, which cannot improve conversion efficiency of the inverter effectively.

SUMMARY

Embodiments of the present invention provide an inverter control method, apparatus, and system, to improve conversion efficiency of an inverter.

According to a first aspect, an embodiment of the present invention provides an inverter control method, including acquiring a power distribution line graph of an inverter in the case of a preset input voltage and a preset output power, where the power distribution line graph includes at least one area, each area is corresponding to one preset switching on/off frequency, and different areas are corresponding to different preset switching on/off frequencies; acquiring an input voltage, and an output power and a switching on/off frequency that are of the input voltage; determining, according to the input voltage and the output power that are acquired, an area to which the inverter belongs in the power distribution line graph; and when the area to which the inverter belongs is not corresponding to the acquired switching on/off frequency, switching the inverter to a preset switching on/off frequency corresponding to the area to which the inverter belongs.

In a first possible implementation manner of the first aspect, when the area to which the inverter belongs is corresponding to the acquired switching on/off frequency, the inverter is kept working at the switching on/off frequency.

With reference to the first aspect or the first possible implementation manner of the first aspect, in a second possible implementation manner, the inverter includes a first preset switching on/off frequency and a second preset switching on/off frequency, and the power distribution line graph includes a first area and a second area, where the first area is corresponding to the first preset switching on/off frequency, and the second area is corresponding to the second preset switching on/off frequency; that the area to which the inverter belongs is not corresponding to the acquired switching on/off frequency includes that the area to which the inverter belongs in the power distribution line graph is the first area, and the acquired switching on/off frequency is equal to the second preset switching on/off frequency; or the area to which the inverter belongs in the power distribution line graph is the second area, and the acquired switching on/off frequency is equal to the first preset switching on/off frequency; and the switching the inverter to a preset switching on/off frequency corresponding to the area to which the inverter belongs includes switching the inverter to the first preset switching on/off frequency, or switching the inverter to the second preset switching on/off frequency.

With reference to the first aspect, the first possible implementation manner or the second possible implementation manner of the first aspect, in a third possible implementation manner, the switching the inverter to a preset switching on/off frequency corresponding to the area to which the inverter belongs includes sending a switch message to the inverter, where the switch message carries the preset switching on/off frequency corresponding to the area to which the inverter belongs, so as to switch the inverter to the preset switching on/off frequency corresponding to the area to which the inverter belongs.

With reference to the first aspect, or any one of the first to the third possible implementation manners of the first aspect, in a fourth possible implementation manner, before the step of switching the inverter to a preset switching on/off frequency corresponding to the area to which the inverter belongs, the method further includes suspending carrier synchronization performed on the inverter.

According to a second aspect, the present invention provides an inverter control apparatus, including a first acquiring unit configured to acquire a power distribution line graph of an inverter in the case of a preset input voltage and a preset output power, where the power distribution line graph includes at least one area, each area is corresponding to one preset switching on/off frequency, and different areas are corresponding to different preset switching on/off frequencies; a second acquiring unit configured to acquire an input voltage, and an output power and a switching on/off frequency that are of the input voltage; a determining unit configured to determine, according to the input voltage and the output power that are acquired by the second acquiring unit, an area to which the inverter belongs in the power distribution line graph; and a processing unit configured to, when the determining unit determines that the area to which the inverter belongs is not corresponding to the acquired switching on/off frequency, switch the inverter to a preset switching on/off frequency corresponding to the area to which the inverter belongs.

In a first possible implementation manner of the second aspect, the processing unit is further configured to, when the determining unit determines that the area to which the inverter belongs is corresponding to the acquired switching on/off frequency, keep the inverter working at the switching on/off frequency.

With reference to the second aspect or the first possible implementation manner of the second aspect, in a second possible implementation manner, the inverter includes a first preset switching on/off frequency and a second preset switching on/off frequency, and the power distribution line graph includes a first area and a second area, where the first area is corresponding to the first preset switching on/off frequency, and the second area is corresponding to the second preset switching on/off frequency; and correspondingly, the processing unit is configured to, when the area to which the inverter belongs in the power distribution line graph is the first area, and the acquired switching on/off frequency is equal to the second preset switching on/off frequency, switch the inverter to the first preset switching on/off frequency; or when the area to which the inverter belongs in the power distribution line graph is the second area, and the acquired switching on/off frequency is equal to the first preset switching on/off frequency, switch the inverter to the second preset switching on/off frequency.

With reference to the second aspect, the first possible implementation manner or the second possible implementation manner of the second aspect, in a third possible implementation manner, the processing unit is configured to send a switch message to the inverter, where the switch message carries the preset switching on/off frequency corresponding to the area to which the inverter belongs, so as to switch the inverter to the preset switching on/off frequency corresponding to the area to which the inverter belongs.

With reference to the second aspect, or any one of the first to the third possible implementation manners of the second aspect, in a fourth possible implementation manner, the apparatus may further include the processing subunit configured to, when the area to which the inverter belongs is not corresponding to the acquired switching on/off frequency, suspend carrier synchronization performed on the inverter.

According to a third aspect, the present invention provides an inverter control system, including the inverter control apparatus described in the second aspect.

As can be seen from the foregoing technical solutions, the embodiments of the present invention have the following advantages.

In the embodiments of the present invention, a power distribution line graph of an inverter in the case of a preset input voltage and a preset output power is acquired first, where the power distribution line graph includes at least one area, each area is corresponding to one preset switching on/off frequency, and different areas are corresponding to different preset switching on/off frequencies; then, an area to which the inverter belongs in the power distribution line graph is determined according to an input voltage and an output power that are acquired; when the area to which the inverter belongs is not corresponding to an acquired switching on/off frequency, a switching on/off frequency of the inverter is switched to a preset switching on/off frequency corresponding to the area to which the inverter belongs. In the embodiments of the present invention, a power distribution line graph in an ideal state is acquired in advance, and then a switching on/off frequency is controlled in real time according to an actual input voltage and an output power of an inverter, which improves control efficiency and accuracy, thereby effectively improving conversion efficiency of the inverter.

BRIEF DESCRIPTION OF DRAWINGS

To describe the technical solutions in the embodiments of the present invention more clearly, the following briefly introduces the accompanying drawings required for describing the embodiments. The accompanying drawings in the following description show merely some embodiments of the present invention, and a person skilled in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are merely some but not all of the embodiments of the present invention. All other embodiments obtained by a person skilled in the art based on the embodiments of the present invention without creative efforts shall fall within the protection scope of the present invention.

In the specification, claims, and accompanying drawings of the present invention, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present invention described herein, for example, can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

Embodiments of the present invention provide an inverter control method, to improve conversion efficiency of an inverter. The embodiments of the present invention further provide a corresponding inverter control apparatus and a related system, which are separately described in detail by using specific embodiments.

An embodiment of the present invention provides an inverter control method. A grid-tied inverter is mainly controlled by an inverter control apparatus, for example, the inverter control apparatus may be an electronic control unit (ECU) located in the grid-tied inverter. In the present invention, the grid-tied inverter is called an inverter for short, which is not construed as a limitation on the present invention. The inverter control method provided in this embodiment of the present invention may be applicable to a grid-tied photovoltaic power generating system, and in an example of this embodiment of the present invention, the method is applied to a grid-tied photovoltaic power generating system for analysis and description, which is not construed as a limitation on the present invention.

In the embodiments of the present invention, a power distribution line graph in an ideal state may be acquired in advance, and then a switching on/off frequency is controlled in real time according to an actual input voltage and an output power of an inverter, which improves control efficiency and accuracy, thereby effectively improving conversion efficiency of the inverter.

Figure 1:
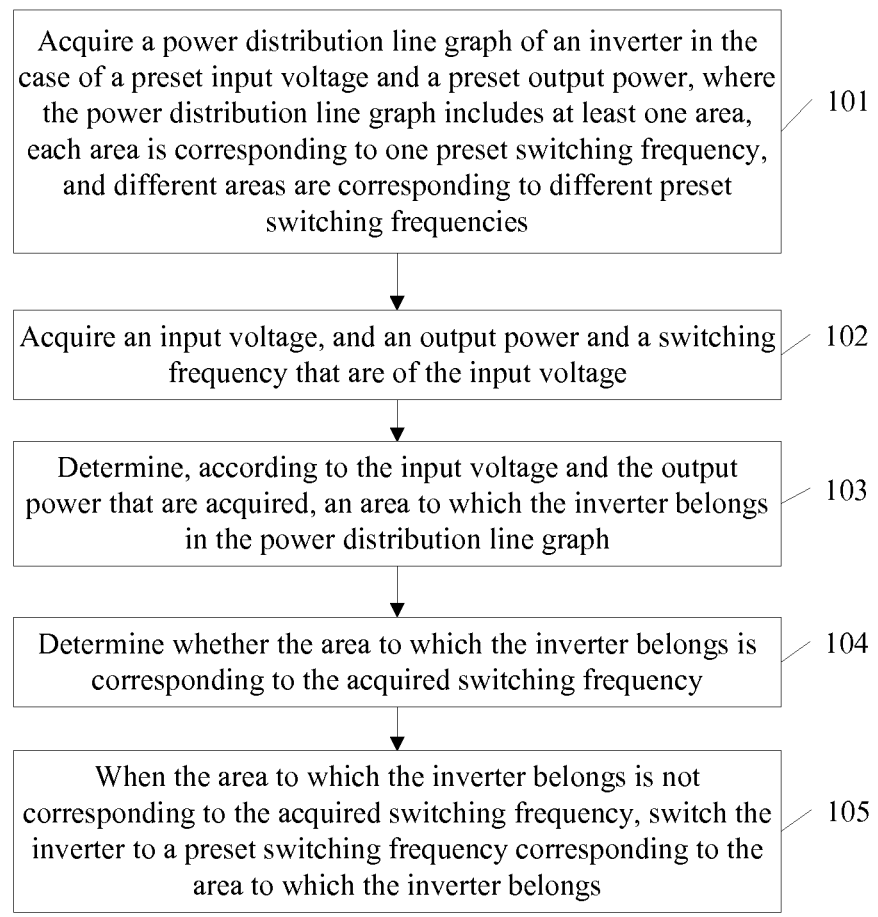
FIG. 1 is a schematic flowchart of an inverter control method according to an embodiment of the present invention.

Referring to FIG. 1, FIG. 1 is a schematic flowchart of an inverter control method according to an embodiment of the present invention, where the inverter control method may include the following steps.

Step 101: Acquire a power distribution line graph of an inverter in the case of a preset input voltage and a preset output power, where the power distribution line graph includes at least one area, each area is corresponding to one preset switching on/off frequency, and different areas are corresponding to different preset switching on/off frequencies.

In an ideal working state, each input voltage of the inverter is corresponding to one ideal output power. In the present invention, an input voltage and an output power of the inverter in an ideal state are called a preset input voltage and a preset output power. It may be understood that, the power distribution line graph is obtained according to a correspondence between the preset input voltage and the preset output power. For example, a horizontal coordinate of the power distribution line graph may indicate the preset input voltage, and a vertical coordinate may indicate the preset output power.

It may be understood that, at least one area is set in the power distribution line graph, and a quantity of areas is related to a working frequency of an inverter switch. For ease of description, a working frequency of an inverter switch is described as a preset working frequency. That is, the inverter may work at at least one preset working frequency. Areas of a corresponding quantity are set in the power distribution line graph, where each area is corresponding to one preset switching on/off frequency, and different areas are corresponding to different preset switching on/off frequencies. For example, if there are two preset switching on/off frequencies for the inverter, the power distribution line graph may be divided into two areas, where each area is corresponding to one preset switching on/off frequency. For another example, if there are three preset switching on/off frequencies for the inverter, the power distribution line graph may be divided into three areas, where each area is corresponding to one preset switching on/off frequency. Other circumstances can be inferred similarly, which are not described herein again.

Step 102: Acquire an input voltage, and an output power and a switching on/off frequency that are of the input voltage.

In actual work, the input voltage of the inverter is acquired, the output power of the inverter corresponding to the input voltage is acquired, and the switching on/off frequency of the output power is acquired. The input voltage of the inverter may be an output voltage of a solar panel.

It may be understood that, all switching on/off frequencies in the present invention are working frequencies of the inverter switch, where the inverter switch may be an insulated gate bipolar transistor (IGBT). Connectivity loss of the IGBT can be effectively reduced if the inverter switch uses different switching on/off frequencies in the case of different powers, thereby effectively improving conversion efficiency of the inverter.

Step 103: Determine, according to the input voltage and the output power that are acquired, an area to which the inverter belongs in the power distribution line graph.

The area to which the inverter belongs may be found in the power distribution line graph according to the input voltage and the output power that are acquired, and therefore, the area of the inverter in the case of this input voltage may be determined. After the area to which the inverter belongs is determined, one preset switching on/off frequency is correspondingly set in the area.

Step 104: Determine whether the area to which the inverter belongs is corresponding to the acquired switching on/off frequency.

One preset switching on/off frequency is correspondingly set in the area to which the inverter belongs. The switching on/off frequency acquired in step 102 is compared with the preset switching on/off frequency; if the acquired switching on/off frequency is inconsistent with the preset switching on/off frequency, it may be determined that the area to which the inverter belongs is not corresponding to the acquired switching on/off frequency, and step 105 is executed.

Step 105: When the area to which the inverter belongs is not corresponding to the acquired switching on/off frequency, switch the inverter to a preset switching on/off frequency corresponding to the area to which the inverter belongs.

When the switching on/off frequency acquired in step 102 is inconsistent with the preset switching on/off frequency, the inverter switch is switched to the preset switching on/off frequency corresponding to the area to which the inverter belongs.

In an implementation manner, the switching the inverter to a preset switching on/off frequency corresponding to the area to which the inverter belongs includes sending a switch message to the inverter, where the switch message carries the preset switching on/off frequency corresponding to the area to which the inverter belongs, and after the inverter receives the switch message, switching the inverter switch to the preset switching on/off frequency corresponding to the area to which the inverter belongs.

To ensure running stability of the inverter, further, when it is determined that the area to which the inverter belongs is not corresponding to the acquired switching on/off frequency, carrier synchronization performed on the inverter needs to be suspended, and then a switching on/off frequency of the inverter is switched to the preset switching on/off frequency corresponding to the area to which the inverter belongs. It may be understood that, after a switching on/off frequency of the inverter is switched to the preset switching on/off frequency corresponding to the area to which the inverter belongs, carrier synchronization continues to be performed on the inverter.

In this embodiment of the present invention, a power distribution line graph of an inverter in the case of a preset input voltage and a preset output power is acquired first, where the power distribution line graph includes at least one area, each area is corresponding to one preset switching on/off frequency, and different areas are corresponding to different preset switching on/off frequencies; then, an area to which the inverter belongs in the power distribution line graph is determined according to an input voltage and an output power that are acquired; when the area to which the inverter belongs is not corresponding to an acquired switching on/off frequency, a switching on/off frequency of the inverter is switched to a preset switching on/off frequency corresponding to the area to which the inverter belongs. In this embodiment of the present invention, a power distribution line graph in an ideal state is acquired in advance, and then a switching on/off frequency is controlled in real time according to an actual input voltage and an output power of an inverter, which improves control efficiency and accuracy, thereby effectively improving conversion efficiency of the inverter.

Figure 2:
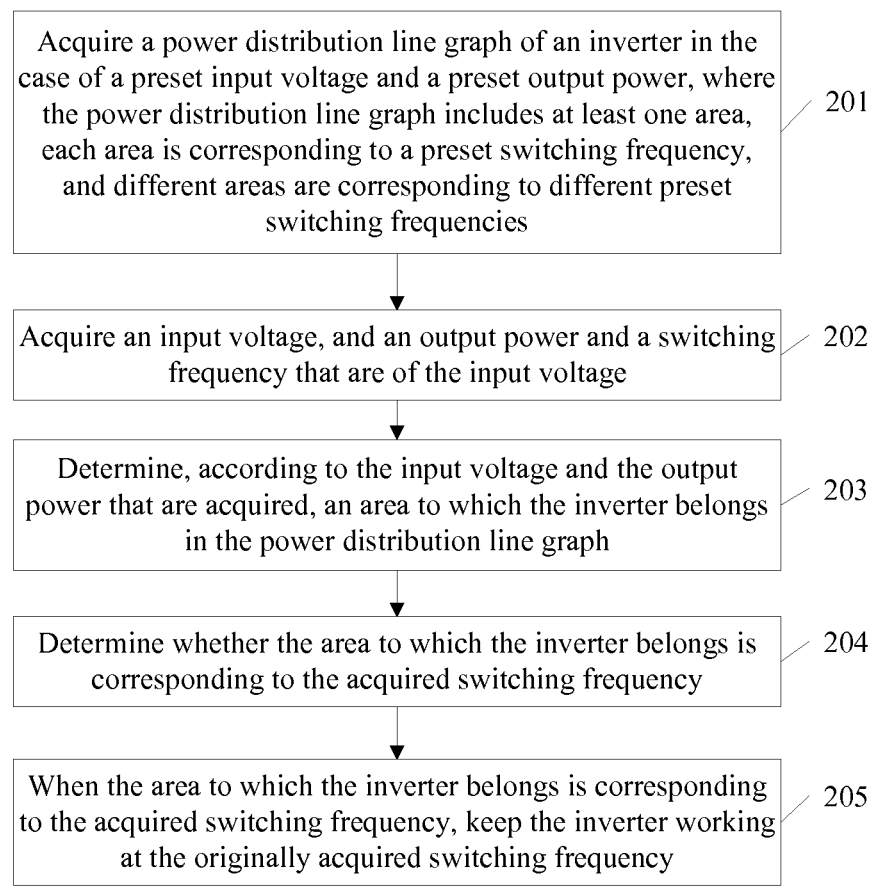
FIG. 2 is another schematic flowchart of an inverter control method according to an embodiment of the present invention.

For ease of understanding, the following uses another embodiment to describe in detail an inverter control method according to an embodiment of the preset invention. Referring to FIG. 2, FIG. 2 is another schematic flowchart of an inverter control method according to an embodiment of the present invention, where the inverter control method may include the following steps.

Step 201: Acquire a power distribution line graph of an inverter in the case of a preset input voltage and a preset output power, where the power distribution line graph includes at least one area, each area is corresponding to one preset switching on/off frequency, and different areas are corresponding to different preset switching on/off frequencies.

A preset input voltage and a preset output power of the inverter in an ideal state are acquired, so as to obtain the power distribution line graph. For example, a horizontal coordinate of the power distribution line graph may indicate the preset input voltage, and a vertical coordinate may indicate the preset output power. A quantity of areas in the power distribution line graph is associated with a quantity of preset switching on/off frequencies, and these two quantities are in one-to-one correspondence.

Step 202: Acquire an input voltage, and an output power and a switching on/off frequency that are of the input voltage.

In actual work, the input voltage of the inverter is acquired, the output power of the inverter corresponding to the input voltage is acquired, and the switching on/off frequency of the output power is acquired.

Step 203: Determine, according to the input voltage and the output power that are acquired, an area to which the inverter belongs in the power distribution line graph.

After the area to which the inverter belongs is determined, one preset switching on/off frequency is correspondingly set in the area.

Step 204: Determine whether the area to which the inverter belongs is corresponding to the acquired switching on/off frequency.

The preset switching on/off frequency corresponding to the area to which the inverter belongs is compared with the acquired switching on/off frequency. If the preset switching on/off frequency is equal to the acquired switching on/off frequency, the area to which the inverter belongs is corresponding to the acquired switching on/off frequency.

Step 205: When the area to which the inverter belongs is corresponding to the acquired switching on/off frequency, keep the inverter working at the originally acquired switching on/off frequency.

When the acquired switching on/off frequency is corresponding to the preset switching on/off frequency, an inverter switch works at a normal switching on/off frequency, the switching on/off frequency does not need to be changed, and the inverter is kept working at the originally acquired frequency.

To better understand this embodiment of the present invention, the following describes this embodiment of the present invention in detail by using a specific application example. For example, the application example may be as follows.

The inverter may work at two preset switching on/off frequencies, and values of the switching on/off frequencies of the inverter may be X kilohertz (kHZ) and Y kHZ. The power distribution line graph includes a first area and a second area, where a switching on/off frequency corresponding to the first area is X kHZ, and a switching on/off frequency corresponding to the second area is Y kHZ. It should be noted that, a specific numeric value of the preset switching on/off frequency of the inverter is not limited in the present invention.

Figure 3:
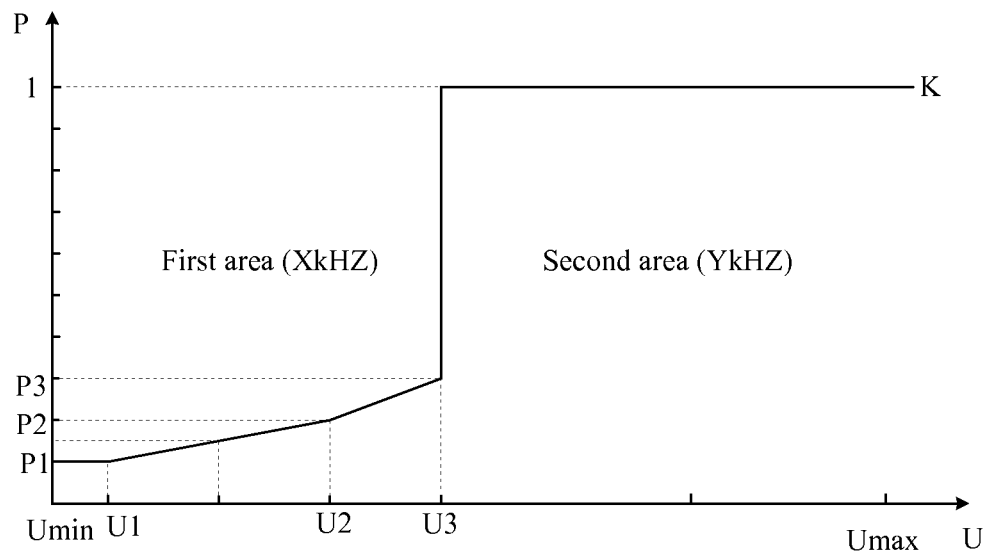
FIG. 3 is a power distribution line graph of an inverter in the case of two preset switching on/off frequencies according to an embodiment of the present invention.

For details, refer to FIG. 3. FIG. 3 is a power distribution line graph acquired when switching on/off frequencies of an inverter are X kHZ and Y kHZ according to an embodiment of the present invention. A horizontal coordinate of the power distribution line graph indicates a preset input voltage U, and a vertical coordinate indicates a preset output power P. A power distribution curve K divides FIG. 3 into two areas, where an area above the power distribution curve K is a first area, and a switching on/off frequency of an inverter switch in the first area is X kHZ; an area below the power distribution curve K is a second area, and a switching on/off frequency of the inverter switch in the second area is Y kHZ.

It can be known from FIG. 3 that, in an ideal state, when a preset input voltage is U1, a preset output power is P1; when a preset input voltage is U2, a preset output power is P2; when a preset input voltage is U3, a preset output power is P3.

In actual work, when an acquired input voltage of the inverter is U1 and an output power of the inverter is greater than P1, it may be determined that the inverter is located in the first area; if an acquired switching on/off frequency is Y kHZ, because the inverter switch works at X kHZ in the first area, the switching on/off frequency of the inverter switch needs to be switched, that is, the switching on/off frequency is switched from Y kHZ to X kHZ; if an acquired switching on/off frequency is X kHZ, the switching on/off frequency of the inverter switch does not need to be changed, and an original working state continues to be kept.

When an acquired input voltage of the inverter is U1 and an output power of the inverter is less than P1, the inverter is located in the second area; if an acquired switching on/off frequency is X kHZ, because the inverter switch works at Y kHZ in the second area, the switching on/off frequency of the inverter switch needs to be switched, that is, the switching on/off frequency is switched from Y kHZ to X kHZ; if an acquired switching on/off frequency is Y kHZ, the switching on/off frequency of the inverter switch does not need to be changed, and an original working state continues to be kept.

When an acquired input voltage of the inverter is U2 and an output power of the inverter is greater than P2, if an acquired switching on/off frequency is Y kHZ, the switching on/off frequency is switched to X kHZ; if an acquired switching on/off frequency is X kHZ, switching does not need to be performed. When an output power of the inverter is less than P2 and an acquired switching on/off frequency is X kHZ, the switching on/off frequency is switched to Y kHZ; if an acquired switching on/off frequency is Y kHZ, switching does not need to be performed.

Likewise, a control manner in which an input voltage of the inverter is U3 may be acquired. For details, refer to the foregoing embodiment, and details are not described herein again.

It may be understood that, multiple inverting modules may be disposed in the inverter in this embodiment of the preset invention. Input sides of the multiple inverting modules are connected in parallel, a same solar panel is shared, and output ends are connected in parallel and are connected to a power grid through an isolation transformer. Each inverting module can independently perform grid-tied working, and one ECU may be used to coordinate and control a working state and carrier synchronization of each inverting module.

To ensure running stability of the inverter, further, carrier synchronization performed on the inverter needs to be suspended, and then a switching on/off frequency of the inverter is switched to a preset switching on/off frequency corresponding to the area to which the inverter belongs. It may be understood that, after a switching on/off frequency of the inverter is switched to the preset switching on/off frequency corresponding to the area to which the inverter belongs, carrier synchronization continues to be performed on the inverter.

For example, when an input voltage of the inverter is U1 and an acquired output power is less than P1, a switching on/off frequency needs to be switched from Y kHZ to X kHZ. Before the switching on/off frequency is switched, carrier synchronization performed on each inverting module of the inverter is suspended. When switching on/off frequencies of all inverting modules are switched to X kHZ, carrier synchronization continues to be performed on the inverting modules of the inverter.

It may be understood that, when the inverter works at three preset switching on/off frequencies, the power distribution line graph may include three areas, which are separately corresponding to the foregoing three preset switching on/off frequencies. In actual work, the area to which the inverter belongs in the power distribution line graph is determined according to an input voltage and an output power that are acquired, where there is one preset switching on/off frequency for the working area of the inverter. A switching on/off frequency acquired according to the input voltage and the output power is compared with the preset switching on/off frequency. If the acquired switching on/off frequency is consistent with the preset switching on/off frequency, the switching on/off frequency of the inverter switch does not need to be switched; if the acquired switching on/off frequency is inconsistent with the preset switching on/off frequency, the switching on/off frequency of the inverter switch needs to be switched to the preset switching on/off frequency corresponding to the area to which the inverter belongs.

Likewise, specific implementation in which the inverter works at four or more preset switching on/off frequencies may be obtained. For the specific implementation, refer to the foregoing embodiment, and details are not described herein again.

To better implement the inverter control method provided in this embodiment of the present invention, an embodiment of the present invention further provides an apparatus that is based on the foregoing inverter control method. Meanings of nouns are the same as those in the foregoing inverter control method. For specific implementation details, refer to the description in the method embodiments.

Figure 4:
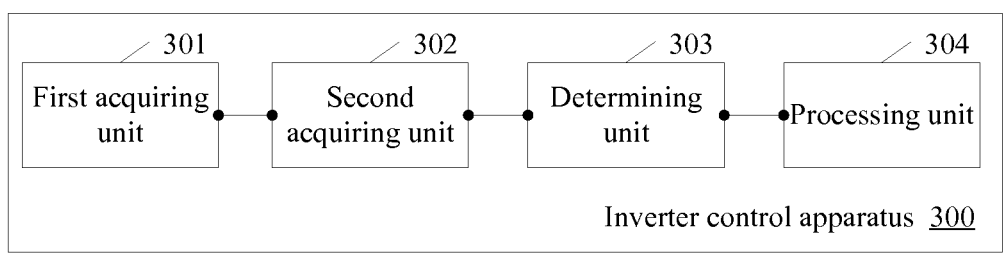
FIG. 4 is a schematic structural diagram of an inverter control apparatus according to an embodiment of the present invention.

Referring to FIG. 4, FIG. 4 is a schematic structural diagram of an inverter control apparatus. An inverter control apparatus 300 may include a first acquiring unit 301, a second acquiring unit 302, a determining unit 303, and a processing unit 304.

The first acquiring unit 301 is configured to acquire a power distribution line graph of an inverter in the case of a preset input voltage and a preset output power, where the power distribution line graph includes at least one area, each area is corresponding to one preset switching on/off frequency, and different areas are corresponding to different preset switching on/off frequencies.

The second acquiring unit 302 is configured to acquire an input voltage, and an output power and a switching on/off frequency that are of the input voltage.

The determining unit 303 is configured to determine, according to the input voltage and the output power that are acquired by the second acquiring unit 302, an area to which the inverter belongs in the power distribution line graph.

The processing unit 304 is configured to, when the determining unit 303 determines that the area to which the inverter belongs is not corresponding to the acquired switching on/off frequency, switch the inverter to a preset switching on/off frequency corresponding to the area to which the inverter belongs.

Further, the processing unit 304 is further configured to, when the determining unit 303 determines that the area to which the inverter belongs is corresponding to the acquired switching on/off frequency, keep the inverter working at the switching on/off frequency.

In this embodiment, the inverter may work at at least one preset working frequency, where areas of a corresponding quantity are set in the power distribution line graph, each area is corresponding to one preset switching on/off frequency, and different areas are corresponding to different preset switching on/off frequencies. For example, if there are two preset switching on/off frequencies for the inverter, the power distribution line graph may be divided into two areas, where each area is corresponding to one preset switching on/off frequency. For another example, if there are three preset switching on/off frequencies for the inverter, the power distribution line graph may be divided into three areas, where each area is corresponding to one preset switching on/off frequency. Other circumstances can be inferred similarly, which are not described herein again.

If the inverter includes a first preset switching on/off frequency and a second preset switching on/off frequency, the power distribution line graph includes a first area and a second area, where the first area is corresponding to the first preset switching on/off frequency, and the second area is corresponding to the second preset switching on/off frequency.

Correspondingly, the processing unit 304 is configured to, when the area to which the inverter belongs in the power distribution line graph is the first area, and the acquired switching on/off frequency is equal to the second preset switching on/off frequency, switch the inverter to the first preset switching on/off frequency; or when the area to which the inverter belongs in the power distribution line graph is the second area, and the acquired switching on/off frequency is equal to the first preset switching on/off frequency, switch the inverter to the second preset switching on/off frequency.

When the determining unit 303 determines that the area to which the inverter belongs is not corresponding to the acquired switching on/off frequency, the processing unit 304 is configured to send a switch message to the inverter, where the switch message carries the preset switching on/off frequency corresponding to the area to which the inverter belongs, so as to switch the inverter to the preset switching on/off frequency corresponding to the area to which the inverter belongs.

Further, the processing unit 304 further includes a processing subunit, which is configured to, when the area to which the inverter belongs is not corresponding to the acquired switching on/off frequency, suspend carrier synchronization performed on the inverter. In this embodiment, carrier synchronization performed on the inverter is suspended first, and then a switching on/off frequency of the inverter is switched to the preset switching on/off frequency corresponding to the area to which the inverter belongs. After a switching on/off frequency of the inverter is switched to the preset switching on/off frequency corresponding to the area to which the inverter belongs, carrier synchronization continues to be performed on the inverter, which can ensure running stability of the inverter.

In addition, the present invention further provides an inverter control system, where the inverter control system may include an inverter control apparatus. The inverter control apparatus is configured to acquire a power distribution line graph of an inverter in the case of a preset input voltage and a preset output power, where the power distribution line graph includes at least one area, each area is corresponding to one preset switching on/off frequency, and different areas are corresponding to different preset switching on/off frequencies; acquire an input voltage, and an output power and a switching on/off frequency that are of the input voltage; determine an area to which the inverter belongs in the power distribution line graph according to the input voltage and the output power that are acquired; and when the area to which the inverter belongs is not corresponding to the acquired switching on/off frequency, switch the inverter to a preset switching on/off frequency corresponding to the area to which the inverter belongs.

Further, the inverter control apparatus is further configured to, when the area to which the inverter belongs is corresponding to the acquired switching on/off frequency, keep the inverter working at the switching on/off frequency.

It should be noted that, for specific implementation of the inverter control apparatus in this embodiment, refer to the foregoing embodiments, and details are not described herein again.

In the foregoing embodiments, the description of each embodiment has respective focuses. For a part that is not described in detail in an embodiment, refer to related descriptions in other embodiments.

Detailed above are an inverter control method, apparatus and system provided in the present invention. In this specification, specific examples are used to describe the principle and implementation manners of the present invention, and the description of the foregoing embodiments is only intended to help understand the method and core idea of the present invention. Meanwhile, a person skilled in the art may, based on the idea of the present invention, make modifications with respect to the specific implementation manners and the application scope. Therefore, the content of this specification shall not be construed as a limitation to the present invention.

What is claimed is:

1. An inverter control method comprising:
    acquiring a power distribution line graph of an inverter comprising:
        a power distribution curve;
        a first area corresponding to a first switching on/off frequency, wherein the first area comprises a first range of preset input voltages and a first range of preset output powers; and
        a second area corresponding to a second switching on/off frequency, wherein the second area comprises a second range of preset input voltages and a second range of preset output powers;
    acquiring an input voltage, an output power, and an operating switching on/off frequency of the inverter;
    determining a determined area based, at least in part, on the input voltage, the output power, and a preset output power corresponding to the input voltage;
    switching the operating switching on/off frequency of the inverter to the first switching on/off frequency when the determined area is the first area and the operating switching on/off frequency is in the second area; and
    switching the operating switching on/off frequency of the inverter to the second switching on/off frequency when the determined area is the second area and the operating switching on/off frequency is in the first area.

2. The method of claim 1, further comprising:
    not switching the operating switching on/off frequency when the determined area is the first area and the operating switching on/off frequency is in the first area; and
    not switching the operating switching on/off frequency when the determined area is the second area and the operating switching on/off frequency is in the second area.

3. The method of claim 1, wherein switching the operating switching on/off frequency comprises sending a switch message to the inverter, wherein the switch message comprises a requested switching on/off frequency corresponding to the determined area.

4. The method of claim 1, wherein prior to switching the operating switching on/off frequency, the method further comprises suspending carrier synchronization performed on the inverter.

5. The method of claim 1, wherein the power distribution line graph further comprises a plurality of additional areas each corresponding to a different one of a plurality of additional switching on/off frequencies, and wherein each of the additional areas comprises a different range of input voltages and a different range of output power.

6. The method of claim 5 further comprising switching the operating switching on/off frequency to one of the additional switching on/off frequencies when the determined area is the corresponding additional area of the one of the additional switching on/off frequencies.

7. The method of claim 1, wherein determining the determined area comprises:
    determining the first area is the determined area when the output power is less than the preset output power corresponding to the input power; and
    determining the second area is the determined area when the output power is greater than the preset output power corresponding to the input power.

8. An inverter apparatus, comprising:
    an inverter; and
    an inverter control apparatus,
        wherein the inverter control apparatus is configured to:
    acquire a power distribution line graph of the inverter, wherein the power distribution line graph comprises:
        a power distribution curve;
        a first area corresponding to a first switching on/off frequency, wherein the first area comprises a first range of preset input voltages and a first range of preset output powers; and
        a second area corresponding to a second switching on/off frequency, wherein the second area comprises a second range of preset input voltages and a second range of preset output powers;

acquire an input voltage, an output power, and an operating switching on/off frequency of the inverter;

determine a determined area based, at least in part, on the input voltage, the output power, and a preset output power corresponding to the input voltage;

switch the operating switching on/off frequency of the inverter to the first switching on/off frequency when the determined area is the first area and the operating switching on/off frequency is in the second area; and switch the operating switching on/off frequency of the inverter to the second switching on/off frequency when the determined area is the second area and the operating switching on/off frequency is in the first area.

9. The apparatus of claim 8, wherein the processor is further configured to:

not switch the operating switching on/off frequency when the determined area is the first area and the operating switching on/off frequency is in the first area; and not switch the operating switching on/off frequency when the determined area is the second area and the operating switching on/off frequency is in the second area.

10. The apparatus of claim 8, wherein the processor is further configured to send a switch message to the inverter, wherein the switch message comprises a requested switching on/off frequency corresponding to the determined area.

11. The apparatus of claim 8, wherein the processor is further configured to suspend carrier synchronization performed on the inverter.

12. The apparatus of claim 8, wherein the power distribution line graph further comprises a plurality of additional areas each corresponding to a different one of a plurality of switching on/off frequencies, and wherein each of the additional areas comprises to a different range of input voltages and a different range of output power.

13. The apparatus of claim 12 further comprising switching the operating switching on/off frequency to one of the additional switching on/off frequencies when the determined area is the corresponding additional area of the one of the additional switching on/off frequencies.

14. The apparatus of claim 8, wherein the processor being configured to determine the determined area comprises the processor being configured to:

determine the first area is the determined area when the output power is less than the preset output power corresponding to the input power; and determine the second area is the determined area when the output power is greater than the preset output power corresponding to the input power.

* * * * *